United States Patent [19]

Greene et al.

[11] 3,737,879

[45] June 5, 1973

[54] SELF-REFRESHING MEMORY

[75] Inventors: Richard M. Greene, Audubon; Donald L. McLaughlin; John O. Paivinen, both of Newtown Square, all of Pa.

[73] Assignee: Mos Technology, Inc., Valley Forge, Pa.

[22] Filed: Jan. 5, 1972

[21] Appl. No.: 215,506

[52] U.S. Cl. ......340/173 R, 340/172.5, 340/173 CA

[51] Int. Cl. ..............................................G11c 7/00

[58] Field of Search....................340/173 R, 173 CA, 340/173 RC, 172.5; 307/238

[56] References Cited

UNITED STATES PATENTS

| | | | |
|---|---|---|---|
| 3,631,408 | 12/1971 | Hachioji-shi | 340/173 CA |
| 3,646,525 | 2/1972 | Linton | 340/173 CA |
| 3,684,897 | 8/1972 | Anderson | 340/173 FF |

OTHER PUBLICATIONS

Harroun, Storage Refresh Control and Synchronization, 6/72, IBM Technical Disclosure Bulletin, Vol. 15, No. 1, pp. 257–258

*Primary Examiner*—Bernard Konick
*Assistant Examiner*—Stuart Hecker
*Attorney*—Robert S. Dunham, Lester W. Clark, Gerald W. Griffin, Howard J. Churchill, R. Bradlee Boal, Raymond McElhannon, Christopher C. Dunham, Robert Scobey and Henry T. Burke

[57] ABSTRACT

A self-refresh circuit having a counter connected to each row of a memory matrix. The matrix is formed of memory units which require repeated refreshing to retain the stored information and the maximum count of each counter corresponds in time to the maximum time that the memory units are permitted to be without a refresh. Each time a row of the matrix is accessed for a writing or a reading and restore operation, the corresponding row counter is reset and its count begins again, so that if at any time the row is not accessed within the period permitted for refreshing a memory unit, its counter completes its count and initiates a mandatory refresh operation for that row while temporarily inhibiting all access to the memory. Also, there is a program sensing unit which determines from the nature of the program steps when access to the memory is not required for a sufficiently long time to permit one or more rows of the memory to be refreshed. When such a time period is detected, a voluntary refresh operation of one or more memory rows nearest to requiring a mandatory refresh is effected, and the corresponding row counters are reset to avoid any interference with the mandatory refresh operation and yet minimize the time in which access to the memory will be inhibited for purposes of memory refresh.

20 Claims, 4 Drawing Figures

Patented June 5, 1973 3,737,879

4 Sheets-Sheet 1

SELF-REFRESHING MEMORY

BACKGROUND OF THE INVENTION

This invention relates to memory systems for data processing equipment and more particularly relates to a self-refreshing memory system.

Some types of random access memories for computers require that the memory units be refreshed repeatedly after information is written into them. MOS (metal-oxide-semi-conductor) memory matrices are an example of this type of memory.

Some of these types of random access memories include a restore circuit which restores information by writing it back into the memory units after information has been read from them. In these types of memories, the memory units are automatically refreshed both when new information is written into them and when information is read from them and restored. An arrangement must be provided, however, to refresh the memory units which do not have information read from them, or new information written into them, for a period of time longer than a predetermined maximum time for refreshing.

In refresh systems of the prior art, the normal system operation is inhibited periodically and every row in the memory matrix refreshed before the normal system operation is again started. This disadvantageously requires frequent system interrupts and refresh operations even at a time when they may not be needed, which is wasteful of memory time and computer time generally.

Accordingly, it is an object of this invention to provide a novel memory system for data processing equipment having a novel mandatory memory-refresh system for selectively refreshing rows of the memory only when such rows require a refresh. With such arrangement, the rows of the memory are advantageously refreshed only when needed and unnecessary interruption of memory access time is avoided.

It is a further object of this invention to incorporate additionally in such memory-refresh system, where the necessary additional circuitry is warranted, a voluntary memory-refresh arrangement which operates to refresh at least one row of the memory matrix, preferably the row closest to requiring a mandatory refresh, whenever there is a pause in the data processing equipment's accessing of the memory. With such arrangement, one or more of the rows of the memory matrix can be advantageously refreshed without any interruption of the concurrent functioning of the data processing equipment.

In accordance with these objects, a memory system is provided having a refresh required selector circuit and a refresh control circuit. The refresh required selector circuit includes a decoder, a different counter for each row of a work-organized random-access memory, a control counter, and an OR gate. The decoder receives the code for each row of the memory that is accessed and records a binary one in the first stage of the row counter corresponding to that row, resetting all other stages of the counter. The control counter counts clock pulses and at the end of its radix shifts each row counter one stage.

The row counters and the control counter have a sufficient number of stages so that a binary one recorded in the first stage of a row counter is shifted to the last stage in the maximum amount of time that the storage units in the memory are to be permitted to remain without refreshing. Thus, after a row of the memory has not been accessed for a period of time as long as the maximum refresh time, a binary one appears in the last stage of the counter corresponding to that row and initiates a refresh.

The refresh control circuit receives a signal from the OR gate in the refresh required selector circuit when a binary one appears in the last stage of any row counter, and provides a signal inhibiting further access to the memory until the indicated row or rows have been refreshed. An encoder also receives a signal from each row counter which has a binary one in its last stage and converts each such signal to an address code that selects and reads the word in the corresponding row or rows of the memory, causing such row or rows to be refreshed by the circuit that automatically restores information read from the memory.

Where the necessary additional circuitry is warranted, the memory system is provided with a program sensing unit which determines from the nature of the program steps when access to the random-access memory is not required for a sufficiently long time to permit one or more rows of the memory to be refreshed voluntarily. When such time period is detected, the encoder receives signals sequentially from the row counters having a binary one closest to its last stage and converts each of these signals to an address code that selects and reads the word in the corresponding row or rows of the memory, causing such row or rows to be voluntarily refreshed during the time access to the memory is not required.

The invention will be better understood from the following detailed description when considered with reference to the accompanying drawings.

DESCRIPTION OF THE PREFERRED EMBODIMENTS

General Features

Figure 1:
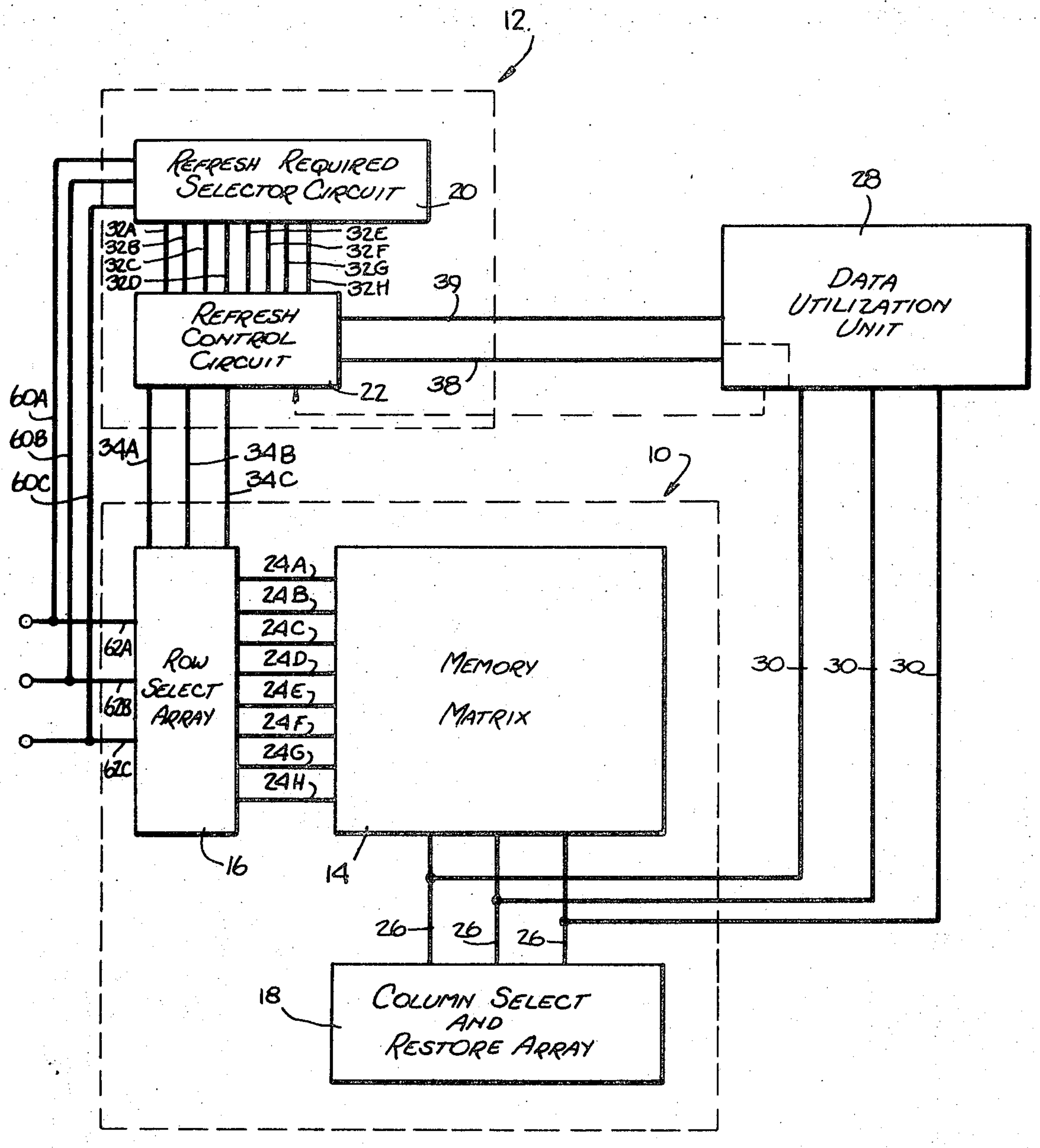
FIG. 1 is a block diagram of a memory system having a self-refreshing system according to the invention.

Referring to the drawings in more detail, wherein like reference numerals used throughout the various Figs. refer to like structure and function, and more specifically referring to FIG. 1, there is depicted a block diagram of a random access memory 10 and a self-refreshing system 12 connected together for operation. The random access memory system 10 includes a memory matrix 14, a row select array 16, and a column select and restore array 18. The self-refreshing system 12 includes a refresh required selector circuit 20 and a refresh control circuit 22.

In the preferred embodiment, the memory matrix 14 includes a plurality of rows and columns of MOS (metal-oxide-silicon) semiconductor storage units. The row select array 16 applies voltages to the rows of the storage units in the matrix through a plurality of row conductors 24A to 24H, and the column select array 18 applies voltages to the columns of the matrix through the column conductors 26, with a row voltage being effective to read a word from a row of storage units, and the row and column voltages cooperating to write or restore a word into a row of storage units.

Words read from the memory matrix 14 are conducted to a data utilization circuit 28 through the conductors 26 and 30, and to the column select and restore array 18 through the conductors 26. The column select and restore array 18 stores words read from the memory matrix 14 and writes them back into the memory matrix.

A suitable memory matrix for use in the embodiment of FIG. 1 is described in U.S. Pat. No. 3,533,089 to S. E. Wahlstrom, issued Oct. 6, 1970.

The refresh required selector circuit 20 of the self-refreshing system 12 includes circuitry which is responsive through conductors 60A, 60B and 60C to row address bits that are applied to the row select array 16 and which determines when a row of the memory matrix 14 needs refreshing, and then identifies this row to the refresh control circuit 22 by sending appropriate signals through a plurality of row conductors 32A to 32H, connecting the refresh required selector circuit 20 and the refresh control circuit 22.

The refresh control circuit 22 is electrically connected to the following units: (1) the row select array 16, through the conductors 34A to 34C, to provide signals to the row select array 16 causing it to address a row of memory units that need refreshing; and (2) the data utilization unit 28, through the conductors 38 and 39 to provide a signal to inhibit the operation of the data utilization unit 28, insofar as it depends upon the read and write operations of the memory matrix 14, until the refresh operation has been completed, and a subsequent signal to restore such operation.

In the operation of the memory system shown in FIG. 1, three distinct functions are especially significant. These are: (1) the reading of information from the memory matrix 14; (2) the writing of information into the memory matrix 14; and (3) the refreshing of the information stored in the memory matrix 14.

To read information from the memory matrix 14 a coded address, designating the row of the memory matrix to be read, is applied to the row address conductors 62A–62C. In response to this, the row select array 16 applies a voltage to the conductor 24 of the desired row to cause the bits of the word in the row to be read into the column conductors 26. These bits are conducted from the column conductors 26 to the data utilization unit 28 by the conductors 30 and to the column select and restore array 18 where they are temporarily stored.

Because the readout from the MOS memory units of the memory matrix 14 may be destructive, the bits of the word may, in some cases, be written back into the row of MOS storage units from the column select and restore array 18. This is done immediately after the read operation by applying the bits to the conductors 26.

Instead of restoring a word read from a selected row, a new word may be written into the selected row. In such case, the new word is applied to the column select and restore array 18 and gated to the column conductors 26 in place of the word read from the row and temporarily stored in the column select and restore array 18.

The read and write operations described briefly above, and the specific circuitry for implementing these operations, are described in detail in the aforementioned U.S. Pat. No. 3,533,089 to Wahlstrom.

To refresh the storage units in the memory matrix 14, the self-refreshing system 12 determines which rows of the memory matrix 14 have not recently been refreshed and selectively refreshes only these rows. It is necessary to periodically refresh the memory elements unless they are written into, or read from and restored, within a certain interval, because the bits are stored as charges on capacitors associated with the MOS devices. Unless the charges are refreshed, rewritten or read and restored, within a certain time interval, they leak from the capacitors and the information is lost.

MANDATORY SELF-REFRESHING SYSTEM

Figure 2:
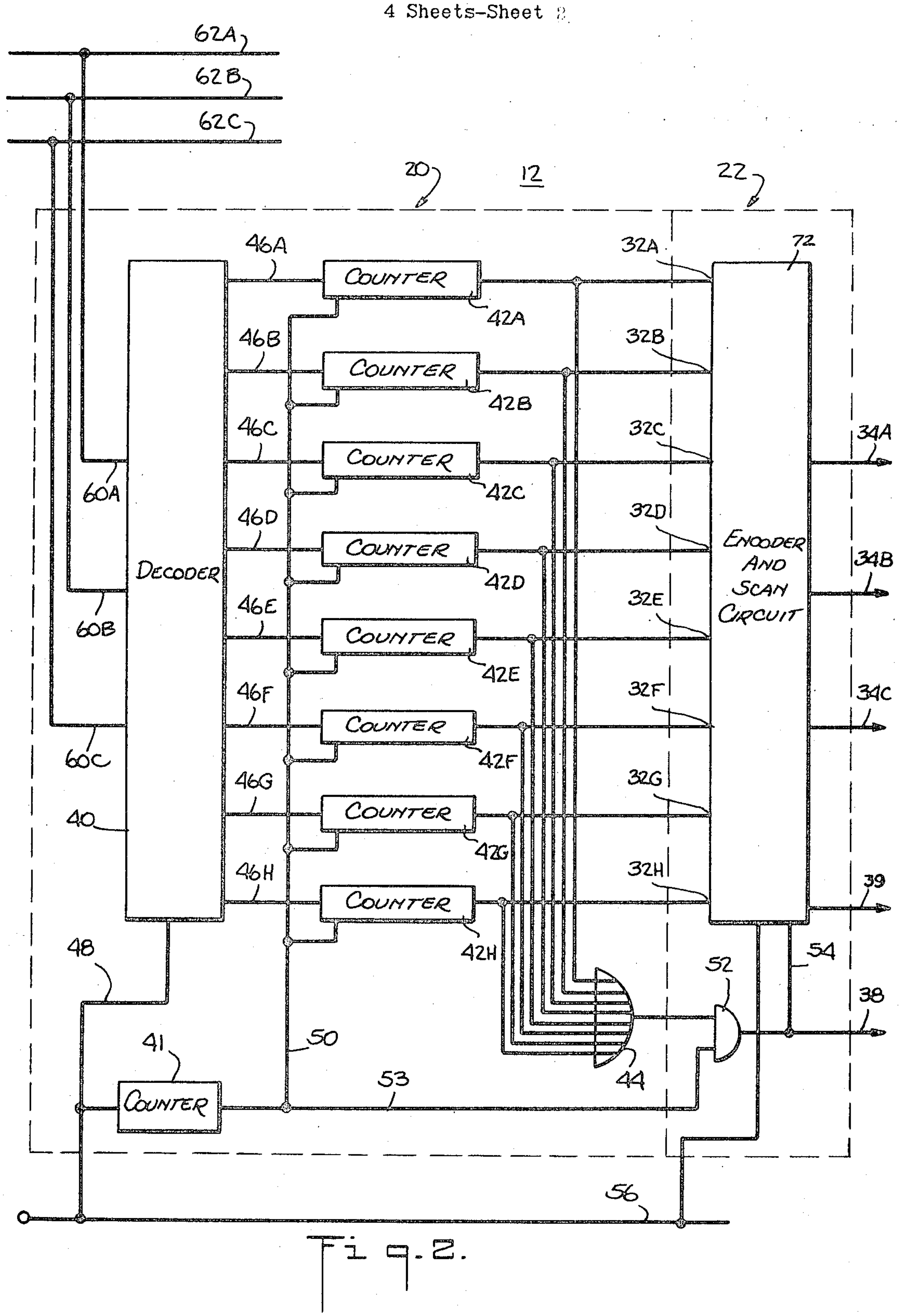
FIG. 2 is a block diagram of a self-refreshing system embodying mandatory refresh operation.

In FIG. 2, there is shown a block diagram of a self-refreshing system which can form the self-refreshing system 12 shown in FIG. 1 and which has mandatory refresh circuitry, that is, circuitry which operates to refresh the memory matrix 14 only when one or more rows thereof need refreshing. Specifically, the refreshing system 12 includes a refresh required selector circuit 20 and a refresh control circuit 22.

The refresh required selector circuit 20 includes circuitry that determines when a row of the memory matrix has not been accessed for reading and restoring, or for writing, or has not been otherwise refreshed for a period of time corresponding to the maximum time period to be allowed before the memory requires mandatory refreshing, and identifies this row to the refresh control circuit 22. The refresh required selector circuit 20 includes, among other elements, a decoder 40, a control counter 41, eight row counters 42A – 42H, and an OR gate 44.

To record the time that has elapsed since each row of the memory matrix 14 (FIG. 1) was accessed, a counter 42 is provided for each row in the memory matrix 14. Thus, each of the eight row counters 42A – 42H is connected to a different one of eight output terminals of the decoder 40 by means of a conductor 46A – 46H.

The decoder 40 receives all of the row address bits that are applied to the row select array 16 of FIG. 1, through the conductors 60A, 60B and 60C connected to the row address conductors 62A, 62B and 62C. Depending upon the row address bits received by the decoder 40, a binary one bit is applied to one of the row counters 42A – 42H, just as the row select array 16 of FIG. 1 applies a binary one to the corresponding row of the memory matrix 14. Thus, each time a row of the memory matrix 14 is accessed, a binary one is written by the decoder 40 into the first stage of the counter 42 which corresponds to the accessed row. Clock pulses are applied to the decoder 40 through the conductor 48 connected to a source of clock pulses (not shown) to synchronize the decoder 40 with the rest of the system.

Although the decoder 40 is represented as receiving a three-bit address word, indicating that one of eight rows is to be accessed in the memory matrix, it is to be understood that this is merely for explanation purposes. In actual practice, a selection from a larger number of rows is made and the address word contains a larger number of bit positions. Moreover, if an address word having a single bit position indicating the selected row were applied to the refresh required selector circuit 20, rather than the coded word, the decoder 40 would be unnecessary, as the single bit would be applied directly to a corresponding one of the row counters 42A – 42H.

Each of the row counters 42A – 42H is identical in structure and operation. When a binary one is written into the first stage of one of these counters, each of the other stages of the counter is automatically reset. This binary one is advanced from stage to stage along the counter, by a shift pulse from control counter 41. Upon receiving a predetermined number of clock pulses through the conductor 48, the control counter 41 applies a shift pulse through the conductor 50 to each of the shift terminals of the counters 42A – 42H.

The refresh control circuit 22 shown in FIG. 2 includes an AND gate 52 and encoder and scan circuit 72. The AND gate 52 has one of its input terminals connected to the output of the OR gate 44, which in turn is connected to the output terminals of the row counters 42A – 42H, and its second input terminal connected by conductor 53 to the output of the counter 41. The output terminal of the AND gate 52 is connected by conductor 54 to the encoder and scan circuit 72 to trigger a scan and encoding operation, and to the conductor 38 to provide an inhibit pulse to the data utilization unit 28 (FIG. 1). Thus, the AND gate 52 acts to inhibit the data utilization unit 28, at least insofar as access to the memory matrix is concerned, and to initiate the encoder and scan circuit 72, when a pulse is received from the control counter 41 and the output of any one of the row counters 42.

The encoder and scan circuit 72 has input terminals 32A to 32H connected to associated ones of the output terminals of the row counters 42A – 42H, and it sequentially scans these terminals for binary ones upon receiving a pulse from the AND gate 52. Each binary one that is sensed at the output of a row counter 42A – 42H indicates that the corresponding row of memory units of the matrix 14 needs to be refreshed. Each such binary one is encoded by the encoder 72 into a three-bit coded address word and applied through the terminals 34A – 34C to the row select array 16 (FIG. 1), to select the row that needs to be refreshed.

To summarize the operation, each time a memory row is to be accessed, a coded row address word is received by the conductors 62A – 62C (FIG. 1). These conductors apply the coded row address bits to the row select array 16 to select the row that is to be accessed, and also apply the same coded bits to the conductors 60A – 60C that are connected to the input of the decoder 40. While the row select array 16 is causing a word to be read from the memory matrix 14, and automatically refreshed, or cooperating with a code applied to the column select array 18 to cause a word to be written into the memory matrix, the decoder 40 applies a binary one through one of its output conductors 46A – 46H to the first stage of one of the row counters 42A – 42H. Thus, the binary one is applied to the row counter which corresponds to the row of the memory matrix 14 (FIG. 1) that is accessed through the row select array 16.

To control the time permitted to elapse before a row of the memory matrix 14 is refreshed, the control counter 41 counts a predetermined number "N" of clock pulses and then pulses the row counters 42A – 42H to cause the binary ones stored in the respective row counters to be shifted one stage. Only a single binary one can be present in any one of the row counters, since a binary one applied to the first stage of any of these counters resets the other stages, as already noted. Since the row counters are thus stepped every N clock pulses, and a binary bit appearing the last stage of any one of these counters initiates a refresh operation, the maximum time that can pass between a read and refresh, or a write, operation in a row and a subsequent row refresh is the product of the radix "N" of the control counter multiplied by the number of stages "M" of the row counters. Stated another way, each row of the memory is refreshed every N × M clock pulse times, unless it has been written into or read from and refreshed within the preceding N × M clock pulse time interval.

To illustrate this by way of example, assume all of the rows of the matrix 14 are initially written into during the same N clock pulses, during which time the control counter 41 completes a count. As this occurs, each of the row counters 42A – 42H receives a binary one in its first stage, the other stages being reset, and at the end of the N counts the binary one in each counter is stepped to its second stage.

Assume further that during the succeeding N counts, none of the rows of the matrix is written into or read and restored. At the end of such N counts, the binary ones will be stepped to the third stage of the respective counters. As this process continues, assume that during the next N counts the rows 24E – 24H are read and restored. In this event, the coded row addresses employed to select these rows will be applied to the decoder 40 in FIG. 2 and cause the application of a binary one to the first stages of row counters 42E – 42H, resetting the remaining stages of these counters. Thus, at the end of these N counts, the binary ones in row counters 46A – 46D will be stepped to the fourth stages, while those in row counters 46E – 46H will merely be stepped to the second stages.

This process continues, with each row counter being reset as its corresponding memory matrix row is accessed. Assume, however, that the control counter 41 has counted to its radix N a total of M successive times, and that during this total time period, the rows 24A and 24C have not been accessed either by a write operation or a read and restore operation. Under these conditions, the binary ones in the row counters 42A and 42C will have been stepped to the last stages of these counters. When this occurs, the AND gate 52 receives both the N pulse from control counter 41 and an input pulse from the OR gate 44, and consequently inhibits the data utilization circuit 28 and activates the encoder and scan circuit 72 to institute a scan of the row counter output terminals.

During this scan operation, each tome the encoder and scan circuit 72 locates a binary one at the output of a row counter it provides a coded row address on the conductors 34A – 34C to the row select array 16, thereby producing a read and restore operation on the corresponding row of the memory matrix.

In the example described, with binary ones appearing only on the output terminals of row counters 42A and 42C, as the encoder and scan circuit 72 begins its scan, it will meet a binary one condition at the first row counter 42A and produce corresponding coded row address signals on conductors 34A – 34C, which signals will activate the row select array 16 to cause a selection and consequent refresh of the memory matrix row 24A.

As the encoder and scan circuit continues its sequential scan, it will not encounter a binary one at the output terminal of row counrer 42B, and the same is true as to row counter 42D – 42H. Consequently, no row address signals will be produced on conductors 34A – 34C at these points in the scan. The encoder and scan circuit 72 will, however, encounter a binary one on the output terminal of row counter 42C, and in response to this binary one will produce coded row address signals on conductors 34A – 34C which will activate the row select array 16 to cause the selection and refreshing of the matrix row 24C.

At the end of the scan by circuit 72, which occurs once the last row counter 42H has been scanned, a reset pulse is applied to line 39 to restore the data utilization unit 28 to its active condition.

The encoder and scan circuit 72 receives clock pulses from conductor 56, so that the scan sequence rate is established by the main clock pulse source.

Since the control counter 41 is continuing its count during the scanning operation, it will be apparent that the scan operation cannot exceed N counts, that is, there must be less than N rows or row counters 42 since the scan circuit is driven by the same clock pulses that drive the control counter 41. Indeed, the next output pulse from the counter 41, which occurs at the next Nth count, shifts the binary ones from the last stage of the row counters 42A and 42C back to the first, or otherwise establishes a binary one state in the first stage of these counters which resets the remaining stages, so that these counters properly indicate that the memory elements in the corresponding rows have just been refreshed.

It will be noted that although the maximum time between refresh operations has been said to be M × N, it may actually exceed this time by the amount of time required for the scan circuit 72 to reach the row counter for the row that is to be refreshed. Moreover, the amount of this added time is a function of the position of row counter in the scan sequence. While this time increment can be considered in setting the M × N period, it is a very small portion of the total period and therefore can generally be ignored.

It will also be noted that certain of the components of the described system have been shown only as block diagrams. The reason for this is that these components are well known and the details of their construction do not form part of this invention. Thus, the row select array 16 in FIG. 1 is simply a standard decoder circuit which receives binary coded address signals on lines 62 and applies a signal to one of the row conductors 24, the selected conductor corresponding to the binary address received. Moreover, decoder 40 in FIG. 2 is the same. The column select and restore array 18, on the other hand, is simply a switching circuit capable of storing at least one bit per column conductor 26. This circuit connects the respective bits of a word to be stored to the column conductors 26 to store the word in the row of memory units selected by the row select array 16, and receives from conductors 26 the respective bits of a word being read and applies these bits to its storage units for purposes of restoring the word. Lastly, the encoder and scan circuit 72 in FIG. 2 is a standard encoder with some means to scan the row counters 42 sequentially and apply a pulse to the data utilization circuit 28 at the end of the scan. This preferrably includes an AND gate connected between the output terminal of each row counter 42 and an encoder circuit, together with a counter having stages A to I. This scan counter is stepped by the clock pulses on conductor 56 and has its successive stages A to H connected to the AND gates associated with row counters 42A to 42H, respectively. Thus, when the operation of the scan counter is initiated, in response to a pulse from AND gate 52, it activates the row AND gates successively so that the output terminals of the row counters 42A – 42H are sequentially connected to the encoder The output of the encoder is, of course, connected to conductors 34A – 34C to produce an appropriate row address code to initiate a refresh of the appropriate row of the memory matrix 14. The last stage I of scan counter is connected to conductor 39 to reactivate the data utilization unit 28 at the end of the scan.

Figure 3:
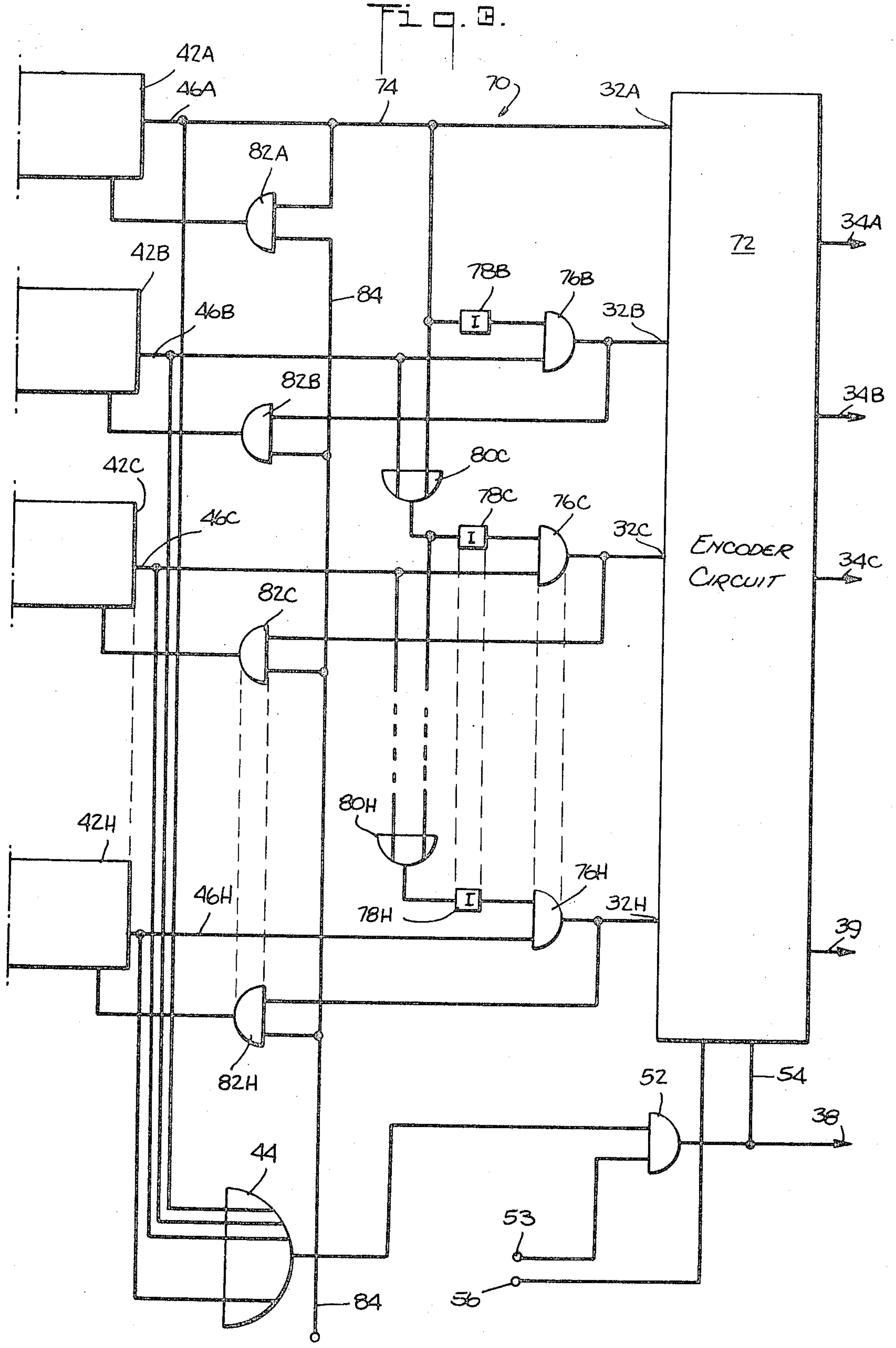
FIG. 3 is a block diagram of another self-refreshing system embodying mandatory refresh operation.

Although the mandatory refresh operation of the self-refreshing system shown in FIG. 2 would occur relatively infrequently, additional reduction in system interrupt time and loss of memory and computer time for refresh operation, can be realized with the scanning modifications shown in FIG. 3. The scanning scheme used in the self-refreshing circuitry shown in FIG. 3 scans only those row counters 42A – 42H which have a binary one at the output terminal, saving system interrupt time required to scan those row counters not requiring mandatory refresh. The mandatory refresh system shown in FIG. 3 is similar in construction and operation to that shown in FIG. 2 except that the sequential scan circuit of the encoder and scan circuit 72 (FIG. 2) is omitted, and the output terminals 46A – 46H of the row counters 42A – 42H are connected through a static logic scanning circuit, shown generally at 70, to an encoder circuit 72.

The encoder circuit 72 is conventional in construction and operates to encode a binary one applied to any of its input terminals 32A – 32H into a three-bit coded address for application through terminals 34A – 34C to the row select array 16 (FIG. 1) to select the row that needs to be refreshed. The encoder circuit 72 is also connected to the output terminals of the row counters 42A – 42H through the OR gate 44 and the AND gate 52. More specifically, the AND gate 52 has one of its input terminals connected to the OR gate 44 and its other input terminal connected by conductor 53 to the output of the counter 41 (not shown). The output terminal of the AND gate 52 is connected by the conductor 54 to the encoder circuit 72 to synchronize its operation, and by the conductor 38 to the data utilization unit 28 (FIG. 1) to inhibit the operation of the data utilization unit during the time required for mandatory refresh. The OR gate 44 has its input terminals connected to the output terminals of the row counters 42A – 42H, and its output terminal connected to the AND gate 52 as previously described. Thus, the AND gate 52 functions to inhibit the data utilization unit during mandatory refresh operation and to initiate the operation of the encoder circuit 72 whenever a binary one is received both from any one of the row counters 42A through 42H and from the control counter 42 (FIG. 2).

The static scanning circuit 70 includes a conductor 74 directly connecting the output terminal 46A of the first row counter 42A to the input terminal 32A of the encoder 72, and logic circuitry, connecting the output terminals 46B – 46H of each of the remaining row counters 42B – 42H to an associated one of the input terminals 32B through 32H of the encoder circuit 72. Specifically, the output terminal 46B of the row counter 42B is connected to one terminal of the AND gate 76B, while the output of the preceding row counter 42A is connected through the inverter 78B to the other input terminal of the AND gate 76B, and the output of the AND gate 76B is connected directly to the input terminal 32B of the encoder circuit 72. Likewise, the output terminal of the row counter 42C is connected to one input terminal of the AND gate 76C, while the outputs of each of the higher row counters 42A and 42B are connected through an OR gate 80C and an inverter 78C to the other input terminal of the AND gate 76C; and the output of the AND gate 76C is connected directly to the input terminal 32C of the encoder circuit 72. Similar circuitry (not shown) is provided between each of the output terminals of the row counters 42D – 42G, and the input terminals 32D – 32G of the encoder circuit 72. The output terminal of the last row counter 42H is connected to one input terminal of an associated AND gate 76H, and each of the output terminals of the higher row counters 42A – 42G are connected through OR gates 80C – 80H, (only OR gates 80C and 80H being shown in FIG. 3) and an associated inverter circuit 78H to the other input terminal of the AND gate 76H. The output of the AND gate 76H is connected directly to the input terminal 32H of the encoder circuit 72.

Since each of the OR gates 80C to 80H receives the output from each of the preceding row counters, each such OR gate need merely be connected to the output of the preceding OR gate and the output of the immediately preceding row counter. Therefore, OR gate 80H is connected only to OR gate 80G and row counter 42G, while OR gate 80G is connected only to OR gate 80F and row counter 42F, and so forth back to OR gate 80C.

The above described components of the static scanning circuit 70 are arranged logically and functionally to present to the encoder circuit 72 a binary one from only the highest row counter having a binary one at its output terminal, even though several row counters may have binary ones at their output terminals. Thus, the static scanning circuit 70 prevents all but the highest row counter having a binary one output from entering the encoder circuit 72.

Reset circuitry is also provided in the static scanning circuit 70 to reset the row counter which is operatively connected to the encoder circuit 72, immediately after the mandatory refresh operation is completed, and to allow the next higher row counter having a binary one output to be connected operatively to the encoder circuit 72. Specifically, the input terminals 32A – 32H are connected to one input terminal of the respective AND gates 82A – 82H, while the other input terminal of each of these AND gates is connected to a common conductor 84 supplied by a source (not shown) of refresh cycle complete pulses indicating completion of the refresh cycle of one row of the memory matrix. This source of pulses may be obtained, for example, from the matrix memory itself.

Thus, the input terminal 32A of the encoder 72 is connected to one input terminal of the AND gate 82A, while the other input terminal of this AND gate is connected to conductor 84 leading to the source of refresh cycle completion pulses (not shown). The output of the AND gate 82A is connected back to the row counter 42A to reset the stages of this row counter upon completion of the refreshing of the corresponding row in the matrix memory 14 (FIG. 1). Similarly, the input terminal 32B of the encoder circuit 72 is connected to one input terminal of the AND gate 82B, while the conductor 84 connected to the source of refresh cycle complete pulses is connected to the other input terminal of the AND gate 82B, and the output terminal of this AND gate is connected to reset the row counter 42B after the corresponding row of the memory matrix is refreshed. Like connections are provided between the input terminals 32C – 32H of the encoder circuit 72 and the AND gates 82C – 82H and row counters 42C – 42H.

To summarize the operation of the static scanning circuit 70, the row counters 42A through 42H operate the same as the row counters described in connection with the self-refreshing system of FIG. 2, so that each time a row in the memory matrix 14 is accessed, a coded row address is provided to reset the corresponding one of the row counters 42A through 42H. Likewise, the row counters 42A through 42H are advanced by a source of clock pulses (not shown) to produce a binary one at the output terminal of these row counters corresponding to the rows in the memory matrix 14 which have not been accessed within the time predetermined for mandatory refresh. When a binary one appears at one or more of the output terminals of the row counters 42A through 42H, the AND gate 52 receives both a control pulse through conductor 53 from the counter 41 (not shown in FIG. 3) and a binary one from one or more of these output terminals through the OR gate 44. Consequently, the AND gate 52 produces an output pulse which is applied through conductor 38 to inhibit the data utilization unit (FIG. 1) and through conductor 54 to initiate the operation of the encoder circuit 72. Simultaneously, a binary one at the output of the highest row counter having a binary one at its output terminal, is applied by the static scanning circuit 70 to the encoder circuit 72. As already indicated, the static scanning circuit 70 operates such that a binary one at the output terminal of any row counter inhibits any binary ones at the output terminals of the lower row counters from reaching the encoder circuit 72, until the higher row counter has activated the encoder circuit 72, causing its corresponding row in the memory matrix 14 to be refreshed. At this point the higher row counter is reset, as explained, and the inhibiting effect on all of the lower row counters is removed.

To illustrate this by way of example, assume that a binary one is produced simultaneously only at the output terminals of the row counters 42A and 42C, indicating that the corresponding rows in the memory matrix 14 must be refreshed. The binary ones from these row counters are coupled through the OR gate 44 to one input terminal of the AND gate 52. Simultaneously, a control pulse is received by AND gate 52 from the counter 41 (FIG. 2) to produce an output pulse on conductors 38 and 54, which inhibits the operation of the data utilization device (FIG. 1) and initiates the mandatory refreshing of the matrix memory 14.

The binary one at the output terminal 46A of the row counter 42A is applied directly through the conductor 74 to the input terminal 32A of the encoder circuit 72, and a coded row address is produced on the conductors 34A – 34C to cause the row select array 16 (FIG. 1) to effect a read and restore operation on the corresponding row of the memory matrix 14. During this read and restore operation of the row corresponding to row counter 42A, the binary one appearing at the output terminal 46C of the row counter 42C is inhibited in its passage to the encoder circuit 72. Specifically, the binary one at the output terminal 46A of the row counter 42A is coupled through the OR gate 80C and the inverter circuit 78C to one input terminal of the AND gate 76C to block or inhibit the passage of the binary one appearing at the output terminal 46C of the row counter 42C.. However, after the encoder circuit 72 has produced a coded address on the conductors 34A – 34C in response to the binary one at the output terminal 46A, to effect a read and restore operation for the row of the memory matrix corresponding to row counter 42A, a refresh complete cycle pulse is applied through the conductor 84 to one input terminal of the AND gate 82A to reset the row counter 42A and remove its binary one output. This removes the inhibit pulse at AND gate 76C so that the binary one appearing at the output terminal 46C of the row counter 42C will pass to the encoder circuit 72, and a coded row address is produced on the conductors 34A – 34C to cause a read and restore operation of the corresponding row of the memory matrix.

It will be appreciated that with the above described arrangement of the static scanning circuit 70, only the output terminals of the row counters 42A through 42H having binary ones are scanned, thus minimizing the interrupt time of the data utilization device 28 (FIG. 1).

Mandatory and Voluntary Self-Refreshing System

An additional feature can be incorporated into the self-refresh system of FIG. 1, where the necessary additional circuit is warranted. This additional feature involves automatically voluntarily refreshing at least one row of the memory matrix, preferably the row closest to requiring a mandatory refresh, whenever there is a sufficient pause in the computer's accessing of the memory matrix to allow such a refresh operation. Thus, whenever the memory matrix is not being accessed by the data utilization device for other purposes, one or more of its rows can be advantageously voluntarily refreshed, thus saving future interruption of the computer's functioning for mandatory refresh.

To this end, a program sensing unit is provided in the data utilization unit 28 (FIG. 1) which determines from the nature of the program control steps of the data utilization unit 28 (FIG. 1) when access to the memory matrix 14 is not required for the operation of the data utilization unit 28 for a sufficiently long time to permit voluntary refresh of one or more rows of the memory matrix 14.

Figure 4:
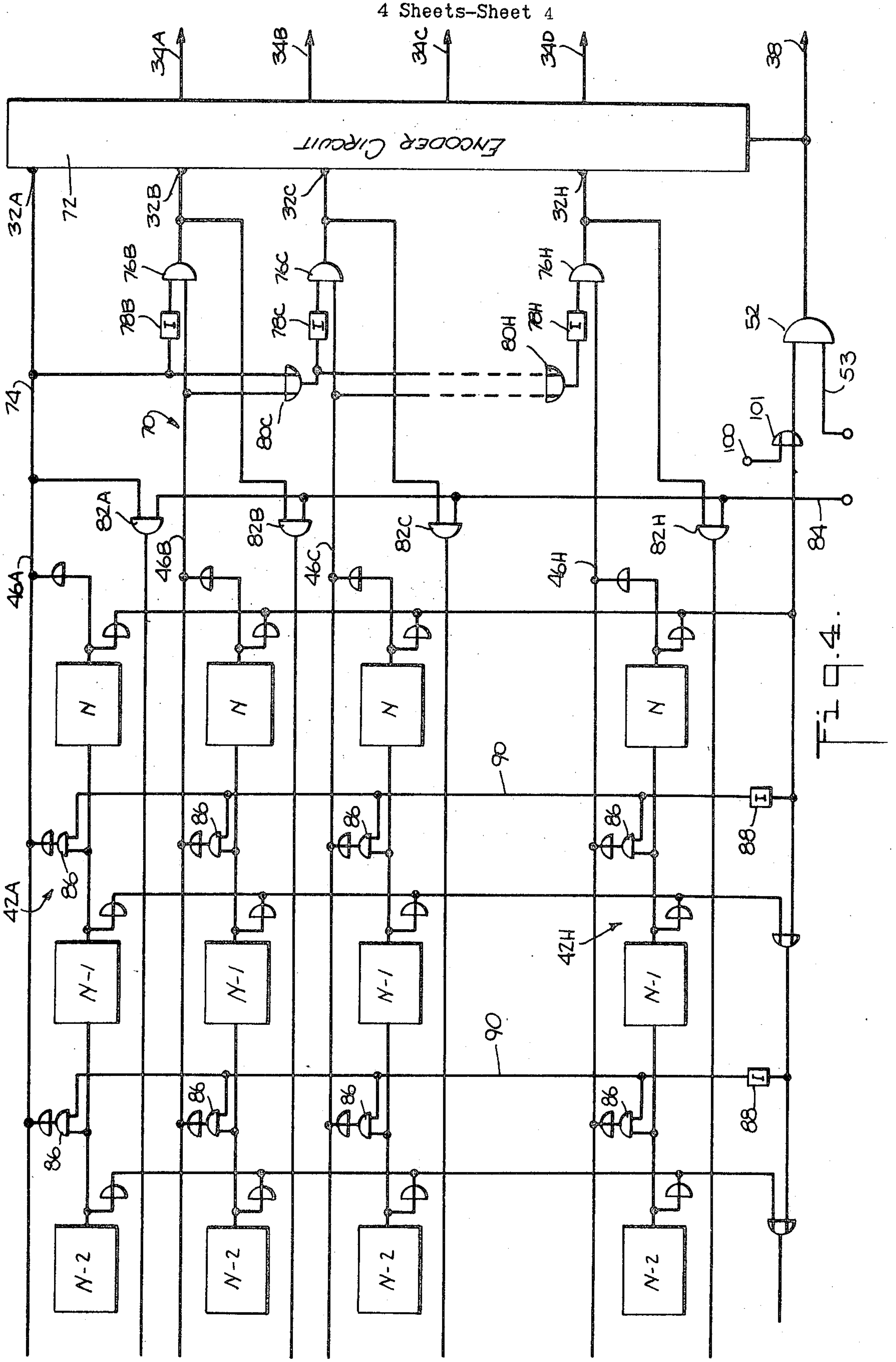
FIG. 4 is a block diagram of still another self-refreshing system embodying both mandatory and voluntary refresh operation.

In FIG. 4, there is shown a self-refreshing system embodying both the mandatory refresh arrangement of FIG. 3 discussed above, and the voluntary refresh arrangement discussed hereinafter. As illustrated, only the last N–2, N–1 and N stages of each of the row counters 42A – 42H are shown.

Thus, for mandatory refresh operation, the output terminal of the N stages of each of the row counters 42A through 42H are connected to the encoder circuit 72 through the static scanning circuit 70, constructed and arranged substantially as described hereinabove in connection with the mandatory refreshing system shown in FIG. 3. Thus, whenever a binary one is shifted through the individual stages of one or more of the row counters 42A through 42H to the last N stage, the static scanning circuit 70 causes the binary one to be selectively coupled to the encoder circuit 72 to produce a coded row address at terminals 34A – 34C and a read and restore operation on the corresponding row of the memory matrix.

In addition, the output of each of the stages (except the Nth stage) of the row counters 42A through 42H is connected through an AND gate 86 to the output terminal of the Nth stage of the corresponding row counter, the other input terminal of the AND gate 86 being connected through an inverter circuit 88 to the output of all stages of the row counters 42A through 42H which are to the right of the associated row counter stage. Thus, for example, the output terminal of the N–1 stage of the row counter 42A is connected to one input terminal of the AND gate 86, whose other input terminal is connected by common bus conductor 90 to an associated inverter circuit 88 which, in turn, is connected to the output terminal of each of the N stages of the row counters 42A through 42H. As shown in FIG. 4, each of the stages (except the *n*th) of the row counters 42A – 42H are similarly connected. With this arrangement, whenever a binary one is present at the output terminal of the N stage of any of the row counters 42A – 42H, binary ones at the output of the N–1 stage of any of the row counters, or at any lower order stage, are blocked in their passage to the encoder circuit 72. Similarly, if a binary one is present at the output of an N–1 stage, the outputs from the N–2 stages, and from all lower order stages, are blocked or inhibited from passage to the encoder circuit 72. Likewise, a binary one appearing at any stage of the row counters 42A – 42H will inhibit the passage of a binary one simultaneously appearing at any stage to its left (as seen in FIG. 4) from passage to the encoder circuit 72.

Also, as discussed in connection with FIG. 3, each output terminal from an N stage of a counter 42B – 42H is blocked or inhibited whenever a binary one appears in the N stage of a higher counter. Thus, a binary one at the N stage of counter 42A will inhibit the N stages of counters 42B – 42H, a binary one at the N stage of counter 42B will inhibit the N stages of counters 42C – 42H, and so forth. Moreover, since all of the stages of each counter are connected to a common output conductor in the circuit of FIG. 4, i.e., to the respective output conductors 46A – 46H, the output of each stage will be inhibited if a binary one appears at the same stage of a higher counter. Thus, a binary one at the N–1 stage of counter 42A will inhibit the N–1 stages of counters 42B – 42H, and so forth.

It will be seen, therefore, that the output of any stage of the counters 42A – 42H is inhibited from passing to the encoder circuit 72 if a binary one appears at a stage either above or to the right of it.

With this arrangement, whenever the program sensing unit (FIG. 1) indicates that access to the memory matrix 14 is not required for a sufficiently long time to permit one or more rows of the memory to be refreshed, the voluntary self-refreshing system shown in FIG. 4 operates to refresh that row (or rows) which has not been accessed for the longest period of time.

By way of illustration, assume that a binary one appears in the N–1 stage of the row counter 42A, in the N–3 stage of the row counter 42C, and in lower order stages in all other counters. Also assume that the program sensing unit indicates that access to the memory matrix 14 will not be required by the data utilization unit 28 for a period allowing refresh of at least one row of the memory matrix. Under these conditions, a refresh cycle available pulse is applied through terminal 100 and OR gate 101 to AND gate 52, which also receives a control pulse on its second input conductor 53 from counter 41 (shown in FIG. 2). Simultaneously, the binary one in the N–1 stage of the row counter 42A and the binary one in the N–3 stage of the row counter 42C are applied to one input terminal of their associated AND gates 86. Since the N stages of each of the row counters 42A – 42H do not have a binary one at their output terminals, thus indicating that mandatory refresh is not required, the inverter circuit 88 associated with the N–1 stage of the row counters allows the binary one in the N–1 stage of the row counters 42A to be coupled to the output terminal 46A of the row counter 42A. This binary one is coupled directly to the encoder circuit 72 to cause a row address to be produced on the conductors 34A – 34C, producing a refresh of the corresponding row in the memory matrix.

Simultaneously, the binary one in the N–1 stage of the row counter 42A is coupled through the associated common bus conductor 90, OR gates and inverter circuits 88, to the second input terminals of the AND gates 86 associated with all of the stages of the row counters to the left of the N–1 stage. Thus, the binary one in the N–3 stage of the row counter 42C is inhibited from passing to the output terminal 46C of the row counter 42C during the refreshing of the row of the memory matrix corresponding to the row counter 42A. However, after completion of this refreshing operation of the row of the memory matrix corresponding to row counter 42A, the row counter 42A is reset by the application of a refresh cycle completion pulse on the conductor 84 of the static scanning circuit 70 and the previously described inhibiting effect on the lower order stages in removed. At the next appearance of a control pulse on conductor 53 from counter 41 (FIG. 2), which serves to advance all of the row counters, so that the binary one in stage N–3 of counter 42C is advanced to stage N–2, if a further refresh cycle available pulse is applied through terminal 100 and OR gate 101 to AND gate 52, the binary one then in the N–2 stage of the row counter 42C is then coupled directly to the output terminal 46C, and thence to the encoder circuit 72 to produce a coded row address on the conductors 34A – 34C and a refresh of the corresponding row of the memory matrix 14. Moreover, this binary one serves to inhibit all of the gates 86 associated with the counter stages to the left of the N–2 stage. This refresh process continues for as long as there is refresh time available, i.e., non-access time which equals at least one refresh cycle time, always refreshing the row of the matrix which corresponds to the counter 42A – 42H having the largest count at the time the refresh time is available.

Actually, the voluntary refresh cycles need not occur only when a control pulse appears on conductor 53, i.e., at each full count of the control counter 41 of FIG. 2, as required by the AND gate 52. Rather, using the circuit of FIG. 4, two or more rows may be refreshed during a single counting operation of counter 41, so long as there is refresh time available.

Thus, with the mandatory and voluntary self-refresh arrangement shown in FIG. 4, the data utilization device 28 (FIG. 1) is interrupted only when a binary one appears at the N or last stage of one of the row counters 42A – 42H, producing a pulse at the second input terminal of OR gate 101 and at the AND gate 52 and causing a mandatory refresh operation. However, a voluntary refresh operation is produced whenever the program sensing unit indicates that there is sufficient pause in the accessing of the memory matrix 14 to allow a voluntary refresh of one or more rows of the memory matrix.

Self-Refreshing System With Warning Signal

One additional feature, or mode of operation, which can be incorporated into the mandatory refresh systems of the foregoing Figures, is the issuance of a warning signal to the data utilization unit 28 a short time, such at 50 microseconds, before the mandatory refresh operation is to take place. The purpose of this signal is to provide a warning period before the refresh operation begins, and before access to the memory is inhibited.

The warning signal advantageously triggers the input circuit to the program register of the data utilization unit 28, to modify the contents of the program register, so as to effect a branch in the program in progress to a special warning-period program. This warning period program can be selected to interrupt the arithmetic operations in progress to fetch the necessary information which will be required from memory during the refresh period which is imminent, storing such fetched information in temporary storage devices, and to utilize such temporary storage devices for information to be stored during the ensuing refresh period, or to divert the arithmetic operations away from those which will require memory accessing during the refresh operation, or simply to bring the arithmetic operations to an efficient or convenient interrupt point by the end of the warning period.

Referring to the mandatory self-refresh system of FIG. 1, and the refresh circuit shown in detail in FIG. 2, and output signal can be taken from the next-to-last stage of each of the row counters 42A – 42H of FIG. 2, or from the preceding stage, and fed into a flip-flop circuit in the data utilization unit 28. In this arrangement, there is one such flip-flop circuit connected to each of the row counters 42, and the outputs of these flip-flops are connected through a buffer circuit to the input circuit of the program register. Once the count in any of the row counters reaches the next-to-last stage, or the preceding stage if this stage is chosen, such that a mandatory refresh is imminent, a signal will set the associated flip-flop and pass through the connected buffer circuit to modify the contents of the program register and initiate the warning-period program. At the end of the warning period, the row counter 42 requiring the mandatory refresh will initiate the refresh operation, after which the data utilization circuit will resume its arithmetic operations. The flip-flop circuits may also be connected to the input terminals of their respective counters 42A – 42H, so as to be reset when their associated counters are reset. Thus, if a counter is reset after it has generated a warning signal to set its associated flip-flop, but before it actually reaches a mandatory refresh point, the flip-flop will also be reset and the data utilization circuit returned to its previous mode of operation.

While this warning feature may be useful in some computer systems, where it may be desirable to have a warning period to complete certain computations, rather than pursuing the originally planned computational program, or to divert to operations not requiring memory access, as discussed, in many computer systems the mandatory refresh system previously described can be utilized without the necessity of the warning feature.

Although embodiments of the invention have been described with some particularity, many variations and modifications of the invention are possible without departing from the above teaching. It is, therefore, to be understood that, within the scope of the appended claims, the invention may be practiced otherwise than as specifically described.

What is claimed is:

1. A memory refresh system for selectively refreshing a memory element comprising a memory element capable of temporarily storing information in response to electrical input signals, conductive terminals connected to said memory element for receiving said input signals, electrical time measuring means for measuring a predetermined time limit corresponding to the maximum time period to be allowed before said memory element is to be refreshed and producing an output signal when such time limit is reached, said time measuring means being associated with said conductive terminals and being reset to its zero time condition whenever a storage input signal appears at said terminals, and means responsive to the output signal of said electrical time measuring means for initiating a refresh of said memory element only when said time measuring means reaches its predetermined time limit.

2. The memory refresh system as in claim 1, wherein the time measuring means comprises a digital counter having a count rate and total count such that the product thereof corresponds to said maximum time period.

3. The memory refresh system as in claim 1 further including data utilization means capable of accessing said memory element through said conductive terminals, said data utilization means including program control means for selectively controlling the access to said memory element, and means responsive to said program control means for initiating a refresh of said memory element when access to said memory element is not required for a sufficiently long time to permit said refresh.

4. A memory refresh system for selectively refreshing any one of a plurality of memory elements only when a refresh is required, comprising a plurality of memory elements each capable of temporarily storing information in response to electrical input signals, a plurality of conductive terminals each connected to one of said memory elements for receiving input signals, a plurality of electrical time measuring means each associated with one of said memory elements for measuring a predetermined time limit corresponding to the maximum time period to be allowed before its associated memory element is to be refreshed, and producing an output signal at an output terminal when such time limit is reached, said plurality of time measuring means being associated with the respective conductive terminals and each being reset to its zero time condition whenever its associated memory element receives an input signal, and mandatory refresh means responsive to the output signal of each said electrical time measuring means for initiating a refresh of its associated memory element only when the time measuring means reaches its predetermined time limit.

5. The memory refresh system as in claim 4, wherein said plurality of the time measuring means comprise a plurality of digital counters each having a count rate and total count such that the product thereof corresponds to the maximum time period for its associated memory element, and further including means to synchronize the count of said digital counters.

6. The memory refresh system as in claim 4, wherein said mandatory refresh means includes, means for scanning the output terminals of said time measuring means, and refresh circuit means connected to said scanning means for refreshing any of said memory elements when said scanning means senses an output signal on its associated time measuring means.

7. The memory refresh system as in claim 4, wherein said mandatory refresh means includes scanning means for scanning the output terminals of said time measuring means, and circuit means responsive to an output signal from any one of said time measuring means for initiating said scanning means and for inhibiting access to said memory elements, except for refresh purposes, when any one of said output signals is present.

8. The memory refresh system as in claim 4 further including data utilization means capable of accessing said memory elements through their associated conductive terminals, said data utilization means including program control means for selectively controlling access to said memory elements, and voluntary refresh means responsive to said program control means for initiating a refresh of at least one of said memory elements when access to said memory elements is not required for a sufficiently long time to permit such refresh.

9. A memory refresh system for selectively refreshing memory elements of a memory matrix comprising a matrix of memory elements arranged in rows and columns, each such memory element being capable of temporarily storing information in response to electrical input signals, a plurality of row conductors and a plurality of column conductors connected to said memory elements in a matrix pattern, a plurality of electrical time measuring means each associated with one of said row conductors for measuring a predetermined time limit corresponding to the maximum time period to be allowed before the memory elements connected to the row conductor are to be refreshed, and producing an output signal on an output terminal when such time limit is reached, each said time measuring means being reset to its zero time condition whenever a signal is applied to its corresponding row conductor, and mandatory refresh means responsive to the output signal of said electrical time measuring means for initiating a refresh of a row of said memory elements only when its connected time measuring means reaches its predetermined time limit.

10. The memory refresh system as in claim 9, wherein said plurality of time measuring means comprise a plurality of digital counters each having a count rate and total count such that the product thereof corresponds to said maximum time period, and further including means to synchronize said digital counters.

11. The memory refresh system as in claim 9, wherein said mandatory refresh means includes, means for scanning the output terminals of said time measuring means, and refresh circuit means connected to said scanning means for refreshing any row of said memory elements when said scanning means senses an output signals on its associated time measuring means.

12. The memory refresh system as in claim 9, where said mandatory refresh means includes scanning means for scanning the output terminals of said time measuring means, and circuit means responsive to an output signal from any one of said time measuring means for initiating said scanning means and for inhibiting access to said memory elements, except for refresh purposes, when any one of said output signals is present.

13. The memory refresh system as in claim 9, further including row decoding means for receiving row address signals and applying a select signal to one of said row conductors in accordance with the digit significance of each group of row address signals received, conductive means for applying a corresponding select signal to the time measuring means associated with the selected row conductor to reset said time measuring means to zero, an encoder responsive to an output signal from any one of said time measuring means to produce further row address signals, corresponding in digit significance to the row address of the row associated with the particular time measuring means that produced the output signal, and conductive means to apply said further row address signals to said row decoding means.

14. The memory refresh system as in claim 9 further including data utilization means capable of accessing said memory elements through said plurality of row conductors and column conductors, said data utilization means including program control means for selectively controlling access to said memory elements, and voluntary refresh means responsive to said program control means for initiating a refresh of at least one of said row of said memory elements when access to said memory elements is not required for a sufficiently long time to permit such refresh.

15. The memory refresh system as in claim 14 wherein said voluntary refresh means includes means for scanning said plurality of electrical time measuring means to detect the means measuring a time closest to said maximum time period.

refresh circuit means connected to said scanning means for refreshing the associated row of said memory elements of said detect electrical time measuring means, and means resetting said first time measuring circuit to its zero time conditions upon refresh of its associated row of said memory elements.

16. A method for selectively refreshing the information stored in a memory element comprising the steps of counting toward a predetermined maximum count at a rate such that the time period required for said predetermined count corresponds to the maximum time period to be allowed before the memory element requires a refresh, interrupting said counting and starting over at zero whenever said memory element receives an information storage signal, and refreshing the information stored in said memory element only when said counting reaches said predetermined count.

17. A method for selectively refreshing the information stored in a memory element as in claim 16 further including the steps of determining when access to memory element is not required for a sufficiently long time to permit refresh of said element, and voluntarily refreshing of said element during said time.

18. A method for selectively refreshing the information stored in a matrix of memory elements arranged in rows and columns, comprising the steps of initiating a separate count toward a predetermined maximum count for each row of said matrix at a rate such that the time period required for the predetermined count corresponds to the maximum time period to be allowed before the memory elements of the corresponding row require a refresh, interrupting the counting and starting the count for such row over at zero whenever the memory elements of the row receive an information storage signal, and refreshing the information stored in selective ones of said rows of memory elements when only the counting for said selected rows reaches said predetermined count.

19. A method as in claim 18, further including observing each separate count sequentially to see if it has reached said predetermined count, and if so, refreshing the memory elements of the corresponding row of said matrix.

20. A method for selectively refreshing the information stored in a matrix of memory elements as in claim 18, further including the steps of determining when access to said memory elements is not required for a sufficiently long time to permit refresh of information stored in at least one of said rows of memory elements, and voluntarily refreshing said rows of memory elements during said time.

* * * * *